(12) United States Patent
Richter et al.

(10) Patent No.: US 8,883,113 B2
(45) Date of Patent: Nov. 11, 2014

(54) DIRECT LIQUID-PHASE COLLECTION AND PROCESSING OF FULLERENIC MATERIALS

(75) Inventors: Henning Richter, Newton, MA (US); Jack B. Howard, Winchester, MA (US)

(73) Assignee: Nano-C, Inc., Westwood, MA (US)

( * ) Notice: Subject to any disclaimer, the term of this patent is extended or adjusted under 35 U.S.C. 154(b) by 691 days.

(21) Appl. No.: 11/896,405

(22) Filed: Aug. 31, 2007

(65) Prior Publication Data

US 2008/0069759 A1     Mar. 20, 2008

Related U.S. Application Data

(60) Provisional application No. 60/841,462, filed on Aug. 31, 2006.

(51) Int. Cl.
*C01B 31/02* (2006.01)
*B82Y 30/00* (2011.01)
*B82Y 40/00* (2011.01)

(52) U.S. Cl.
CPC ......... *C01B 31/0233* (2013.01); *C01B 31/0213* (2013.01); *C01B 31/0273* (2013.01); *B82Y 30/00* (2013.01); *B82Y 40/00* (2013.01)
USPC ....................................................... 423/447.1

(58) Field of Classification Search
USPC ................................ 423/461, 215.5; 977/845
See application file for complete search history.

(56) References Cited

U.S. PATENT DOCUMENTS

| | | | |
|---|---|---|---|
| 2,896,927 A | 7/1959 | Nagle | |
| 3,493,595 A | 2/1970 | Strasser | |
| 3,620,700 A * | 11/1971 | Schlinger et al. | ............... 48/215 |
| 5,985,232 A | 11/1999 | Howard et al. | |
| 6,099,696 A | 8/2000 | Schwob et al. | |
| 2003/0044341 A1 | 3/2003 | Alford et al. | |
| 2005/0232846 A1* | 10/2005 | Noguchi et al. | ............... 423/461 |
| 2006/0093885 A1* | 5/2006 | Krusic et al. | ..................... 429/33 |
| 2007/0293693 A1* | 12/2007 | Krusic et al. | .................. 558/425 |
| 2009/0226704 A1* | 9/2009 | Kauppinen et al. | ........... 428/323 |

FOREIGN PATENT DOCUMENTS

| | | |
|---|---|---|
| EP | 1491496 A1 | 12/2004 |
| JP | 200426579 | 1/2004 |
| JP | 2005501793 | 1/2005 |
| JP | 2006517505 A | 7/2006 |
| JP | 2006523175 | 10/2006 |
| WO | WO-93/25473 A1 | 12/1993 |
| WO | WO-95/06001 A1 | 3/1995 |

(Continued)

OTHER PUBLICATIONS

Xu et al., CN1931716 A translation, Mar. 21, 2007.*
Britz et al., "Noncovalent Interactions of Molecules with Single Walled Carbon Nanotubes", Mar. 23, 2006, Chem. Soc. Rev., vol. 35, pp. 637-659, especially p. 643, 3.2. Solution phase.

(Continued)

*Primary Examiner* — Melissa Stalder
(74) *Attorney, Agent, or Firm* — Wilmer Cutler Pickering Hale and Dorr LLP (57) ABSTRACT

An in-situ method and system of collecting, in a liquid, non-agglomerated fullerenic material from a gaseous suspension is provided. The method and system collects non-agglomerated fullerenic material by contacting a gaseous suspension comprising fullerenic material with a suspension liquid, so as to capture the fullerenic material in the suspension liquid; and collecting the liquid suspension as a suspension liquid containing the fullerenic material. This method and system may be particularly useful for collecting fullerenes or nanotubes and maintaining them in solution in non-agglomerated states.

22 Claims, 2 Drawing Sheets

(56) References Cited

FOREIGN PATENT DOCUMENTS

| WO | WO-02/072510 | 9/2002 |
| WO | WO-03/050040 | 6/2003 |
| WO | WO-03/062146 A1 | 7/2003 |
| WO | WO-2005/007565 A2 | 1/2005 |
| WO | WO-2005110594 A1 | 11/2005 |

OTHER PUBLICATIONS

Patent Cooperation Treaty, International Search Report, dated Jan. 16, 2008, 2 pages.
Translation of Japanese Office Action issued for Japanese Application No. 2009-526947, dated Nov. 29, 2012 (7 pages).
Supplementary European Search Report issued for EP07814647, dated Jul. 14, 2011 (2 pages).

* cited by examiner

DIRECT LIQUID-PHASE COLLECTION AND PROCESSING OF FULLERENIC MATERIALS

The invention relates generally to an in-situ method of collecting fullerenic material, such as fullerenes and nanotubes, in a non-agglomerated state.

BACKGROUND

Fullerenic materials may be synthesized using a laser to ablate graphite, burning graphite in a furnace or by producing an arc across two graphite electrodes in an inert atmosphere. Combustion of a fullerenic-forming fuel under well-controlled conditions has evolved to be an attractive method particularly for high volume production. In each method, condensable matter comprising a mixture of soot, other insoluble condensed matter, $C_{60}$, $C_{70}$, and higher as well as lower numbered fullerenes, and polycyclic aromatic hydrocarbons (PAH) in varying amounts is collected as a condensed solid, with the total fullerene fraction typically between 5 and 15% of the total material collected, and soot being 80%-95% of the remaining total material. Carbon nanotubes, also part of the class of fullerenic materials, can be synthesized in significant yields with the use of metal catalysts in electric arc, combustion, laser ablation or chemical vapor deposition systems. The relative abundance of multi-walled (MWCNT) or single-walled carbon nanotubes (SWCNT) depends strongly on the catalyst added. For instance, the addition of iron pentacarbonyl as a catalyst precursor to premixed hydrocarbon/oxygen allows for the selective formation of SWCNT. Between 25% to greater than 40% by weight of SWCNT in condensed material can be typically obtained, with the remainder the material being mainly iron and iron oxide.

Forming dispersions of fullerenic materials from condensed solids gathered by these synthetic routes can be difficult. Although techniques such as exfoliation, dispersion and debundling of nanotubes in solution have been reported, these techniques require selecting a specific surfactant and solvent to enhance the dispersion, in addition to applying some method of physical agitation, such as ultrasonification or centrifugation. Dispersions formed by this process, however, tend to readily agglomerate and in many cases, do not sufficiently disperse. Moreover, significant quantities of surfactant is generally required for the dispersion, which is not always compatible with later processing steps that may be required to utilize the fullerenic material. The presence of surfactants can also reduce the effectiveness or functionality of the fullerenic material. For instance, the enhancement of electric conductivity by nanotubes drops sharply when the necessary quantity of surfactant to disperse the nanotubes is present. In addition, sonication may induce defects in the SWCNT and introduce unwanted properties in the SWCNT. Thus, the formation of stable solutions having significant amounts of non-agglomerated nanotubes remains elusive.

The capture of aerosol combustion products, such as amorphous carbonaceous particles, has been performed to help assess their potential health hazardous effect, as well as to study the size distribution of particles at different locations within and above a combustion flame. An aerosol is composed of solid (or liquid) particles in a gas suspension. For purposes of studying particle size, the most important consideration is to avoid altering the particle mass concentration, number concentration, and size distributions by the measuring equipment so that the collected sample at the sampling position has same properties as particles made by an undisturbed flame. Particles made by combustion processes are affected by size-dependent forces such as gravity, diffusion and inertia. For small particles, e.g., less than about 500 nm, diffusion is by far the most important size-dependent force. Diffusion is the net transport of particles from a region of higher concentration to a region of lower concentration caused by the particles' Brownian motion. The relative motion between particles that is caused by diffusion is termed thermal coagulation. Depending on the strength of the intermolecular interactions between particles, thermal coagulation can lead to agglomeration of particles, e.g., clusters of particles. Whether particles will agglomerate depends strongly on collision efficiencies between the particles involved. Because of strong Van der Waals forces between fullerenic materials, particularly nanotubes, thermal coagulation can pose a major challenge for sampling combustion product that is unaffected by agglomeration.

SUMMARY

Liquid and gas-phase collection of fullerenic carbon material is described, which may be appropriate for production processes that produce fullerenic material as a gas, a condensable solid or as a solid suspended in a gaseous phase. The fullerenic materials are entrained, as gases or solids, in an entrainment medium such as an entrainment gas, vapor, or gas-borne liquid droplets. The fullerenic materials are transferred from the entrainment medium to a suspension liquid in a diluted state and are maintained in the suspension liquid in a non-agglomerated state. Methods to quench or minimize the extent of chemical reactions and physical processes such as agglomeration and to facilitate liquid-phase product processing are also provided.

In some aspects, the method and system entrains gas borne particles of fullerenic material in an entrainment medium, such as a vapor stream or condensable gas. The vapor stream or condensable gas may be in a vapor or gaseous state, which is capable of condensing or forming a liquid phase.

In one aspect, the method collects non-agglomerated fullerenic material in a process that includes creating a stream of entrainment medium, contacting the stream of entrainment medium to fullerenic material that is a gas or a solid in a gaseous suspension so as to entrain the fullerenic material in the stream, collecting the stream containing fullerenic material, and condensing the stream containing fullerenic material into a liquid suspension.

In one or more embodiments, the fullerenic material is generated in situ at a synthesis site, and the fullerenic materials are entrained in the entrainment medium in-situ. By in-situ, it is meant that the fullerenic material is not collected as a powder or other solid prior to the liquid-phase collection process described herein. In other embodiments, the fullerenic materials are re-suspended as a particulate aerosol prior to entrainment by the entrainment medium. The entrainment medium containing the fullerenic material is condensed from a vapor or gas to a liquid and at least a portion of the fullerenic material is incorporated into the condensed liquid. Because the fullerenic material is collected in a liquid or gas in a highly dilute state, it is initially in a non-agglomerated state. With appropriate control of the nature of the solvent and the concentration of fullerenic material in the resultant liquid suspension, and the optional inclusion of surfactants, the fullerenic material can be maintained in a non-agglomerated state.

In some embodiments, the liquid forms finely dispersed liquid droplets, such as a liquid droplet aerosol. The liquid droplets are subsequently delivered to a collection zone, where the fullerenic material is collected and maintained in a liquid suspension. In another aspect, the method and system collects fullerenic material, such as nanotubes, in liquid suspension from a gaseous suspension of nanotubes. The gas comprising the suspension may originate from the combustion products generated during the combustion synthesis of the nanotubes. A carrier gas may be optionally introduced to the suspended nanotube particles after the production of the fullerenic product. The gaseous suspension containing the nanotubes is then contacted with a liquid that can capture the nanotubes and provide a nanotube liquid suspension in which the nanotubes are in a substantially non-agglomerated state. Depending on the chosen solvent, concentrations of up to about 25 to 30 mg/mL of fullerenes and up to 5 mg/mL of nanotubes can be obtained and maintained in a non-agglomerated states. In some embodiments, an operator may increase the concentration of fullerenic material in the suspension liquid by recycling the collected liquid suspension to entrain additional fullerenic material.

In one embodiment, a method of collecting non-agglomerated fullerenic material is provided, comprising: contacting a gaseous suspension comprising fullerenic material with a suspension liquid, wherein the suspension liquid captures the fullerenic material; and collecting a liquid suspension comprising the suspension liquid containing the captured fullerenic material. In a further embodiment, the fullerenic material used in the method described herein is a condensable gas, a condensed solid, and/or solid particulate. In one or more preferred embodiments, the fullerenic material comprises fullerenes and/or nanotubes. The methods described herein may be applied to fullerenic material produced in a flame combustion process in the presence of a catalyst. In one or more embodiments, the fullerenic materials may be made by combusting an unsaturated hydrocarbon fuel and oxygen in a burner chamber at sub-atmospheric pressures.

In an alternative embodiment, the gaseous suspension of fullerenic material comprises a diluent gas. The diluent may be an inert gas, a reactive gas, gas vapor, nitrogen, a noble gas, carbon dioxide, steam, flue gases, or mixtures thereof.

In one or more embodiments, the suspension liquid comprises an organic solvent or an aqueous solution. The suspension liquid may optionally include one or more additives, such as oxidation agents, acids, bases, surfactants, radical scavengers, chemical quenching agents, and chemical stabilization agents. The organic solvent, in one or more embodiments, may be, for instance, substituted aromatic molecules, alkyl substituted aromatics, halogenated substituted molecules, halogenated alkanes, partially hydrogenated aromatics, alkylamines, cyclic ethers, ortho-dichlorobenzene, xylene, benzene, dimethylformamide, ethylene chloride, chloroform, 1,2,4 trimethylbenzene, 1,2,3,4 tetramethylbenzene, tetrahydrofuran, 1,2 dibromobenzene, 1,1,2,2, tetrachloroethane, 1,2,3,4 tetrahydronapthalene, octadecylamine, acetone, and mixtures thereof. The aqueous solution, in one or more embodiments, comprises surfactant, such as sodium cholate, NaDDBS ($C_{12}H_{25}C_6H_4SO_3Na$), sodium octylbenzene sulfonate (NaOBS; $C_8H_{17}C_6H_4SO_3Na$), sodium butylbenzene sulfonate (NaBBS; $C_4H_9C_6H_4SO_3Na$), sodium benzoate ($C_6H_5CO_2Na$), sodium dodecyl sulfate (SDS; $CH_3(CH_2)_{11}$—$OSO_3Na$) (TX100; $C_8H_{17}C_6H_4(OCH_2CH_2)n$-OH; n~10), dodecyltrimethylammonium bromide (DTAB; $CH_3(CH_2)_{11}N(CH_3)_3Br$), dextrin, and poly(styrene)-poly-(ethylene oxide) (PS-PEO) diblock copolymer. The method described may further include liquid-phase processing of the fullerenic material, such as, extracting a class of fullerenic material from the suspension, acid extraction of catalyst particles, oxidation treatment of catalyst particles, oxidative opening of fullerenic materials; shortening nanotubes, exfoliating and dispersing nanotube bundles, ropes and rafts, dispersing nanotubes, and derivatizing the fullerenic material.

In one or more alternative embodiments, the gaseous suspension is contacted with the suspension liquid by creating a stream of the suspension liquid, said stream comprising a gas, vapor, or liquid droplets of the suspension liquid; contacting the stream of the suspension liquid with the gaseous suspension of fullerenic material in an entrainment zone so as to entrain the fullerenic material in the stream of suspension liquid; and collecting the contacted liquid suspension by condensing to a bulk liquid the stream of suspension liquid. In a further alternative embodiment, the gaseous suspension is contacted with the suspension liquid in an entrainment zone having a temperature, wherein the temperature of the entrainment zone is controlled. In one or more embodiments, the temperature is controlled to be at a selected temperature to prevent the suspension liquid from condensing in the entrainment zone. In an alternative embodiment, contacting the stream of suspension liquid with the gaseous suspension of fullerenic material further comprises injecting the stream of suspension liquid to intersect with the gaseous suspension of fullerenic material. In one or more embodiments, the stream of suspension liquid comprises the bulk liquid. In a further alternative embodiment, a portion of the bulk liquid is directed for use in providing a subsequent stream of suspension liquid.

In one or more alternative embodiments, contacting the gaseous suspension of fullerenic material with the suspension liquid comprises bubbling the gaseous suspension through the suspension liquid.

In addition, a collection system for collecting non-agglomerated fullerenic material is described herein, comprising: a first chamber, said chamber comprising a first inlet to receive a gaseous suspension comprising fullerenic material, a second inlet to deliver a suspension liquid into the first chamber and an outlet; an injection apparatus coupled to said second inlet, said injection apparatus is configured and arranged to generate a gas, liquid vapor, or liquid droplets of a suspension liquid, and a liquid collector that is in flow communication with the first chamber through said outlet, said collector comprising a condenser capable of condensing the gas, liquid vapor or liquid droplets of suspension liquid, and a reservoir for receiving a condensed suspension liquid.

In or more embodiments, the first inlet on the collection system is in flow communication with a combustion reactor that is configured and arranged to produce a gaseous suspension of a fullerenic material. In a further alternative embodiment, the system comprises a third inlet that is in flow communication with the first chamber to accept and mix a diluent gas with the fullerenic material. In one or more embodiments, the injection apparatus is, for example, an eductor, porous plate, nebulizer, electrosprayer, or sonicator. The system described herein may further comprise a heater which is in thermal contact with the first chamber, and which has a temperature that can be controlled. In one or more embodiments, the heater is capable of generating a temperature gradient in the first chamber.

In one or more alternative embodiments, the condenser in the collection system is a liquid disengagement column, wherein the reservoir is located below the liquid disengagement column. The collection system may optionally include in the liquid disengagement column a separation medium, to facilitate separating the fullerenic material from the gaseous suspension In one or more embodiments, the separation medium may be, for example, glass beads, shell-shaped articles, irregular shaped articles, or sand.

In one or more alternative embodiments, the collection system further comprises a recycle conduit in flow communication with the reservoir and the injection apparatus so as to direct the condensed suspension liquid to the injection apparatus. The collection system may further include a dispersement device to disperse a portion of the liquid suspension at the top of the condenser. In a further alternative embodiment, a portion of the condensed suspension liquid in the recycle conduit is directed to the dispersement device.

These and other features will be apparent upon consideration of the following detailed description of preferred embodiments thereof, presented in connection with the following drawings in which like reference numerals identify like elements throughout. The invention is not limited to achieve the objects and advantages described herein, and may achieve other objects and advantages. In addition, the non-limiting embodiments of the invention may not achieve any of the stated objects or advantages herein.

DESCRIPTION OF THE DRAWINGS

A more complete appreciation of the invention and many of its advantages will be understood by reference to the description of the invention when considered in connection with the following drawings, which are presented for the purpose of illustration only and are not intended to be limiting and in which.

DETAILED DESCRIPTION

The term "fullerenic material," as used herein, may include fullerenes, fullerenic black or soot, and fullerenic nanostructures of various shapes including onions, single-walled and multi-walled carbon nanotubes. The composition of the material is usually primarily carbon but other elements may be present. The nanostructures may consist of one or more concentric or approximately concentric walls. The different types of fullerenic material may be at different stages of growth and exhibit different degrees of agglomeration, and may occur with amorphous or other forms of carbon. When catalysts are used, for example as floating or entrained particles, the catalyst particles may be at different stages of growth and agglomeration. The methods described herein may be applied to combustion, chemical vapor deposition, or any other type of process that produces fullerenic material in the vapor phase, as particles suspended in a gas phase, or in any other state in which the material is amenable to entrainment by an entrainment medium or capture by a suspension liquid.

The term "entrainment medium" may be a liquid, vapor, or gas, or any combination thereof, which is capable of being condensed to a liquid.

"Fullerenes" is defined to include cagelike, hollow molecules composed of hexagonal and pentagonal groups of atoms, preferably carbon atoms.

"Nanotubes" is defined as an elongated cage or cylinder of atoms such as carbon. The nanotubes may comprise one or more concentric cylinders of carbon atoms.

"Gaseous suspension" is defined to include gas molecules, liquid or solid, which is suspended in a gaseous medium.

Figure 2:
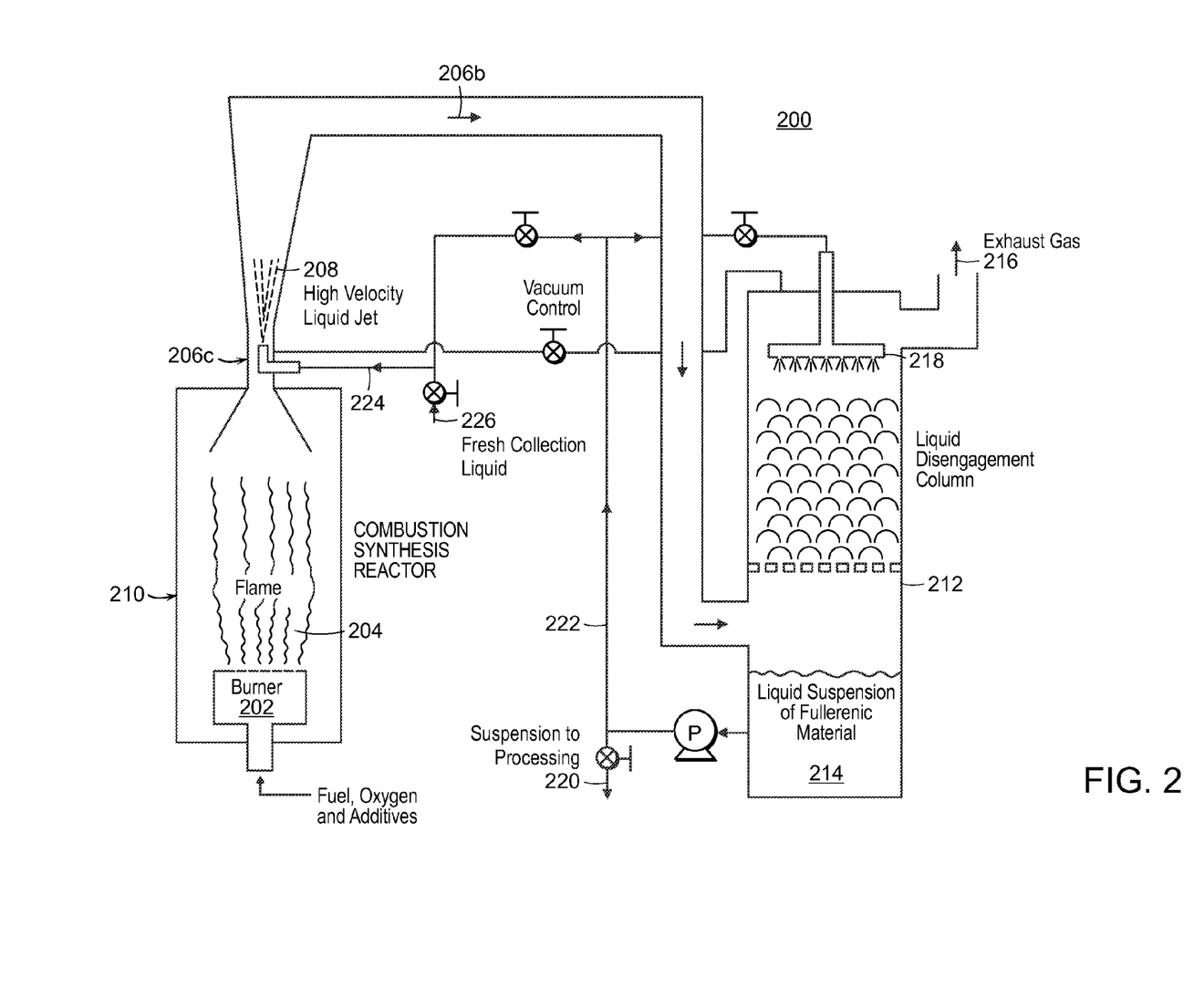
FIG. 2 is a schematic illustration of a direct-liquid collection of fullerenic material from a synthesis reactor.

In one or more embodiments, the fullerenic material is generated from a combustion reaction according to methods known in the art. Combustion synthesis of fullerenes and/or nanotubes have been described in U.S. Pat. Nos. 5,273,729; 5,985,232, and 6,162,411, which are incorporated herein by reference in their entirety. FIG. 2 shows a combustion chamber using a laminar flow system, which is an appropriate system for small scale set production. Larger scale production may benefit from the use of a reactor that invokes turbulent flow. Such a reactor is described in pending U.S. application Ser. No. 10/489,846, which is incorporated herein by reference in their entirety. The same principles and methods used to collect fullerenic material on a small-scale from a combustion chamber may be applied to a larger scale reactor.

The principles of fullerenic material production, aerosol formation and liquid collection are described herein with reference to the combustion synthesis of fullerenic materials. It is recognized, however, that fullerenic materials made by other well-known methods, e.g., electric arc, laser ablation and chemical vapor deposition, that also result in fullerenic products that can be generated as a gaseous suspension which are suitable for use in the methods disclosed herein.

In a combustion synthesis reaction, a fullerenic nanostructure is prepared by establishing a flame by combustion of an unsaturated hydrocarbon fuel and oxygen in a burner chamber at sub-atmospheric pressures. The fuel may be combusted in a laminar flame or in a turbulent flame. The combustion process may use a premixed or diffusion flame. The combustion process may use a one-dimensional flame. Exemplary combustion conditions include a burner chamber at pressures in the range of 20 to 300 torr, and more preferably 80 to 200 torr; the diluent concentration is in the range of 0-50 vol %; the carbon to oxygen ratio (C/O) is in the range of 0.85 to 1.10; and the gas velocity is in the range of 25 to 50 cm/sec. Preferred diluents include argon, nitrogen, carbon dioxide, steam, flue gases and mixtures thereof. If it is desired to prepare carbon nanotubes, a catalyst is introduced into the flame to promote the formation of single shell fullerenic nanotubes. Exemplary catalysts include iron, cobalt, nickel, calcium, magnesium, manganese, potassium, rubidium and strontium. In one or more embodiments, an iron, cobalt or nickel-based catalyst may be used. Iron pentacarbonyl is an example of a commonly used catalyst.

Flame combustion synthesis using the conditions described above produces fullerenic nanostructures, which are dispersed in the gas phase. If a catalyst is included, the flame may additionally include unreacted catalyst or catalyst by-products such as iron metal and iron oxide. When the reaction products exit the combustion reactor, the chemical reaction of the fuel and other new agents is substantially complete. The products may, however, continue to agglomerate. It has been observed, for example, that the extent of agglomeration of gas-borne nanotubes after exit from a reaction chamber increases with time. In other words, where combustion products exit the combustion reactor and traverse through an exit conduit, the bundling of fullerenic materials grows more pronounced downstream of the combustion reactor. Physical agglomeration of the nanotubes occurs even after the chemical transformations leading to the nanotubes and other fullerenic materials have been quenched.

Immediately after combustion, nanoparticles are generally borne in a gas phase that includes the combustion product of the fuel, such as hydrogen and carbon monoxide, as well as unreacted fuel and diluent gases (hereinafter "combustion gases"). In one embodiment, the gaseous dispersion of fullerenic material exits the combustion synthesis reactor into an entrainment chamber, such as an egress conduit, where the fullerenic nanoparticles form a gaseous suspension. The entrainment chamber may be a channel, a conduit, or any other kind of enclosure that can enclose a gaseous suspension of fullerenic material. The entrainment chamber may further include one or more inlets for the introduction of gases, vapors, or liquid droplets that may be used in the liquid collection process. The velocity of the gaseous dispersion along the length of entrainment chamber, the concentration of fullerenic material, and the dwell time in the chamber are selected to provide a dilute suspension of fullerenic material and to minimize agglomeration of the nanostructures. In one or more embodiments, a diluent gas may be introduced into the entrainment chamber. The diluent gas can be introduced at varying velocities and in varying amounts so as to help control or adjust the concentration of fullerenic material in the suspension. Suitable diluent gases include, nitrogen, noble gases, carbon dioxide, steam, flue gases and mixtures thereof. The diluent gas can be introduced as a moving gas stream. In some embodiments, the diluent gas is preferably introduced to move in the same flow direction as the exhaust gas that comes from the combustion reactor. In one embodiment, the velocity of the diluent gas is the same or greater than the exhaust gas. The entrainment medium may be a suspension liquid that is introduced into the entrainment chamber by any suitable injection apparatus, such as an eductor, porous plate, nebulizer, electrosprayer, or sonicator. By introducing a diluent gas into the entrainment chamber with the gaseous suspension, the fullerenic material rapidly dilutes, which significantly helps reduce agglomeration of the nanotubes. Dilution factors of one hundred to one hundred fifty fold are possible with this method. In other embodiments, the distances and dwell time in the entrainment chamber are minimized to reduce opportunities for agglomeration of the nanostructures.

The suspension liquid and gaseous suspension is carried to an exit location of the entrainment chamber, where they enter a collector. The collector may include a reservoir that can hold a suspension liquid, and a tube, needle, conduit or feed means to direct the gaseous suspension of fullerenic materials into the suspension liquid. The suspension liquid is selected for its ability to interact with the fullerenic material and to provide a suspending medium for the material that does not promote agglomeration. Exemplary solvents for the suspension of nanotubes includes orthodichlorobenzene, dimethylformamide, or water with suitable surfactant. Suspension liquids are known in the art and any suitable liquid may be used.

Figure 1:
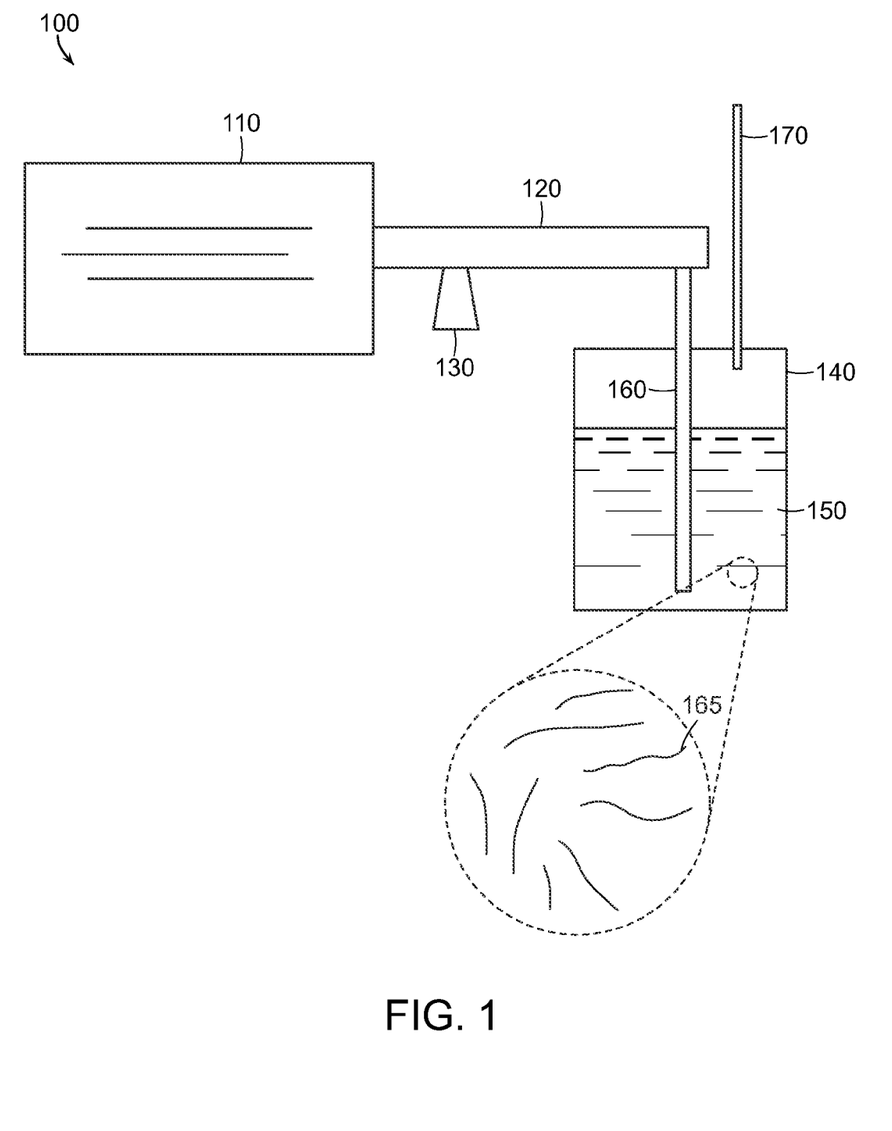
FIG. 1 is a schematic illustration of liquid collection of fullerenic material in a suspension liquid according to one or more embodiments.

FIG. 1 is a schematic illustration of a combustion and liquid separation apparatus 100 for use in one or more embodiments of this invention. The system includes a combustion reactor 110. The combustion chamber may generate a laminar or a turbulent flow, however, a laminar flow chamber is illustrated here. The system includes an entrainment chamber 120, which is in flow communication with the combustion chamber at a location that is remote from the flame. The entrainment chamber 120 may include an inlet jet 130, for introduction of additional gaseous, vaporous or aerosol components into the entrainment chamber. The entrainment chamber is in flow communication with a liquid collector 140 at a location remote from the combustion chamber. The liquid collector can be a reservoir or receptacle that is capable of holding a suspension liquid 150. A gaseous suspension of well separated fullerenic material is introduced into the liquid collector via an inlet port 160, which typically introduces the gaseous flow at a location that is below the surface of the suspension liquid. As the gas borne fullerenic nanostructures bubbles through the suspension liquid, the nanotubes 165 are taken up by the liquid to form a suspension. In one embodiment the nanotubes are introduced into the suspension liquid in a substantially non-agglomerated form, so that each nanotube is free to interact with the liquid. The resultant liquid provides a stable suspension of nanotubes or other fullerenic material that is well-dispersed throughout the suspension liquid in concentrations as high as 30 mg/mL. The exhaust gas 170 exits at the top of the column. Subsequent processing of the fullerenic material is greatly benefited by the rapid quenching of chemical reactions and concentration dilution by the rapid mixing of reactor product with suspension liquid. In addition, these benefits can be enhanced by the use of other reactants or additives in the collecting liquid 150.

In another embodiment, the suspended fullerenic materials may freely interact with an entrainment medium, such as a moving stream of aerosol liquid or gas that can be condensed to a liquid. For nanotubes, orthodichlorobenzene, dimethylformamide, or water with suitable surfactant, maybe used as the entrainment medium. In some cases, reactants or additives, for example oxidation agents, acids, bases, surfactants, radical scavengers or other chemical quenching or stabilization agents, etc. may be advantageous or necessary to process the fullerenic material. The beneficial effects of reactants or additives may be enhanced if they are already present in the entrainment medium and/or the condensed liquid after the fullerenic material is entrained. Such operation is possible with this method.

The entrainment medium may be introduced into the entrainment chamber by any suitable injection apparatus, including, for example, an eductor, porous plate, nebulizer, electrosprayer, or sonicator. The entrainment medium may be contacted with the combustion products as a gas, aerosol, gas vapor, or as a spray of liquid, which condenses to a liquid. As an aerosol liquid, the entrainment medium is composed of small droplets of liquid. In one alternative embodiment, the entrainment medium can be a gaseous vapor of a condensable liquid, such as water. In a further alternative embodiment, the entrainment medium is a gas. In a preferred embodiment, the gas is inert, such as nitrogen or a noble gas.

In one embodiment, the stream of entrainment medium may be a combination of one or more aerosol liquids, gas vapors, and gases. By contacting a high-velocity stream of entrainment medium with the reaction products, the products rapidly dilute, which significantly helps reduce agglomeration of the fullerenic material. Dilution factors of one hundred to one hundred fifty fold are possible with this method. The entrainment medium, when exposed to the fullerenic material, entraps the material, which is a gas or particulate suspended in a gaseous medium. The entrainment medium is preferably contacted with the fullerenic material as a high-velocity stream so as to create the smallest droplet size and maximize the surface area by which the entrainment medium can capture the fullerenic material.

For fullerenic materials that condense into particulate solids upon cooling, the temperature of the entrainment chamber is preferably maintained so as to prevent the gaseous suspension of fullerenic material from condensing either in the entrainment chamber or on the surface of the chamber. Thus, for instance, the temperature of the entrainment chamber, in one embodiment, is preferably maintained high enough to prevent fullerenes from subliming into solid form. After the suspension liquid has contacted the gaseous suspension of fullerenes, the fullerenes, in one embodiment, will dissolve into the suspension liquid. In one embodiment, the temperature within the entrainment chamber is maintained so that the suspension liquid containing fullerenic material will preferably only condense after it has reached the liquid collection zone, e.g., bubbler or liquid disengagement column In one or more embodiments, a gas, vapor stream, or liquid droplets from an injection port is injected into the flight path of the emission from the gas combustion process so as to act as a carrier to move fullerenes and nanotubes along an egress conduit. As the entrained fullerenic material exits the entrainment chamber, it is collected at a collection zone. If a vapor stream is used as the entrainment medium, it is condensed after contacting the combustion products to provide a liquid suspension of fullerenic material that is well dispersed. Preferably, in one or more embodiments, the droplet size is submicron sized, or sized so as to limit the number of fullerenic nanostructures that may be captured by each droplet.

In one or more embodiments, if a gas is used, the gas stream is contacted with the gaseous suspension. For instance, in the case of nanotubes, an inert gas, such as nitrogen, may be used to help dilute the particle concentration of nanotubes and thereby keep the nanotubes non-agglomerated. The entrained nanotubes is suspended and transported by the gas to a collection zone, where the gas-nanotube mixture is contacted with a liquid to extract the nanotubes. In one embodiment, the gas is preferably bubbled through the liquid to extract the nanotubes. Preferably, the liquid is an organic solvent, such as orthodichlorobenzene, that is readily soluble with the nanotubes or other desired fullerenic material. Any other method to extract the nanotubes from the gas may be applied so long as the concentration of nanotubes remains sufficiently dilute to prevent their agglomeration.

In one embodiment, an injection port may generate, for example, an aerosol or vapor by injecting a high-velocity gas in close proximity to the liquid or the liquid vapor. In one or more embodiments, the droplets composing the liquid vapor are submicron sized, and preferably close in magnitude to the size of the fullerenic material being collected so as to prevent each fullerenic molecule from agglomerating with each other.

In one or more embodiments, the collection zone may additionally include a liquid disengagement column or other apparatus to enhance the condensation and/or collection of the liquid suspension of fullerenic materials. The collection zone, in one embodiment, may be a condensation chamber which has been chilled so as to cause the entrainment medium to condense to a liquid. In other embodiments, this system may include a liquid disengagement apparatus, which can provide high-surface area to increase the opportunities for fullerenic material to be absorbed into the suspension liquid. The high-surface area of the liquid disengagement column provides additional opportunities for fullerenic material to be absorbed into the liquid. Gravity may pull the condensed suspended fullerenic liquid to an area below the collection zone to be gathered. The collection zone can help to further concentrate fullerenic material into the liquid phase on the theory that not all the material has been absorbed into liquid droplets by the time they exit the egress conduit. The suspension liquid may be then collected as a stable suspension of fullerenic materials for various applications.

The liquid disengagement apparatus may be any high-surface area column. In one embodiment, the liquid disengagement apparatus is a chromatographic-type or a distillation-type column made out of glass or metal. The column may be optionally packed with glass beads, shell-shaped articles, or any other non-reactive objects, which improves the mixing between the gaseous fullerenic material and liquid suspension as it condenses. In other embodiments, the liquid disengagement apparatus includes a liquid reservoir to permit collection of the liquid suspension at the bottom of the disengagement column.

With fresh suspension liquid, concentrations between 0.5 and 5 mg/mL of fullerenic material may be collected by contacting the suspension liquid with the gaseous suspension of fullerenic material and subsequently condensing the contacted suspension liquid. Even higher concentrations are possible by using the collected liquid suspension containing the fullerenic material as the suspension liquid. By recycling the suspension liquid, high concentrations of nanotubes can be obtained without the need to use sonication, which, as discussed above, may affect the quality of the nanotubes. Further efficiencies in extracting the fullerenic material from the gaseous suspension may be gained by spraying suspension liquid over the separation medium which condenses the contacted suspension liquid into a bulk liquid.

In one or more embodiments, the velocity of the entraining medium matches the velocity of the exhaust gas from the combustion reactor. In one preferred embodiment, the entrainment medium is injected at a high velocity so as to create fine droplets of suspension liquid, which should help promote greater dilution of the fullerenic material.

In some embodiments, a surfactant, such as sodium cholate, NaDDBS ($C_{12}H_{25}C_6H_4SO_3Na$), sodium octylbenzene sulfonate (NaOBS; $C_8H_{17}C_6H_4SO_3Na$), sodium butylbenzene sulfonate (NaBBS; $C_4H_9C_6H_4SO_3Na$), sodium benzoate ($C_6H_5CO_2Na$), sodium dodecyl sulfate (SDS; $CH_3(CH_2)_{11}$—$OSO_3Na$) (TX100; $C_8H_{17}C_6H_4(OCH_2CH_2)n$-OH; n~10), dodecyltrimethylammonium bromide (DTAB; $CH_3(CH_2)_{11}N(CH_3)_3Br$), dextrin, and/or poly(styrene)-poly-(ethylene oxide) (PS-PEO) diblock copolymer, can be added to the suspension to help maintain the dispersion. In alternative embodiments, the combustion reactor or a zone downstream of the egress conduit is the entrainment chamber. In one or more embodiments, the entrainment medium is preferably injected as early as possible after the desired fullerenic material has been synthesized to quench any further chemical reactions and to avoid or minimize agglomeration.

The liquid suspension of fullerenic material gathered by the methods described may also contain impurities and by-products from the combustion reactor. In one embodiment, a liquid suspension of nanotubes will often contain iron and iron oxide as a result of the catalyst used in the combustion reactor. Such impurities may be removed by contacting the liquid suspension with another suitable liquid, which is more soluble with the impurities and/or will destroy the impurities. For instance, acid treatment of an organic liquid suspension of nanotubes may be one method by which the metal catalyst and its by-products may be removed. In one embodiment, an aqueous hydrochloric acid or nitric acid solution may be contacted with a organic liquid suspension containing the nanotubes. The acid will solvate the catalyst in the aqueous phase, while the nanotubes remain in the organic phase. When a surfactant is used in an aqueous solution, the surfactant may be removed by first applying the fullerenic material in the liquid suspension to the desired application, such as a photovoltaic substrate, and subsequently, after the fullerenic material is set in the substrate, washing away the surfactant with an aqueous solution. Other purification steps, such as oxidative treatment and magnetic purification may also be applied to the liquid suspension so long as the concentration of nanotube remains sufficiently dilute to maintain the non-agglomerated state of the nanotubes.

In other embodiments, the system is provided with a recycle loop, which recycles the liquid suspension of fullerenic materials back into the entrainment chamber to further collect and concentrate the fullerenic material in the suspension medium. As is shown in FIG. 2, the recycle loop returns a portion of the suspended fullerenic materials to the entrainment chamber through the injection port. By continually cycling back this liquid suspension into the liquid collection process, the liquid becomes increasingly more concentrated with suspended fullerenic particles. The concentration of the suspended liquid can be controlled by controlling the extent and duration of the recycle process. When using the recycle loop, the volume of liquid needs to be controlled, therefore it is understood that a small portion of the liquid suspension will be bled off prior to recycling so as to maintain a constant volume.

EXAMPLE 1

An illustrative example of an application of the invented method and collection system is shown in FIG. 2. Fullerenic material is synthesized by means of a premixed flame 204 which is stabilized on a burner 202 within a combustion chamber 210. Combustion products ($CO$, $CO_2$, $H_2O$, $H_2$, . . . ) loaded with fullerenic material, which is either gaseous (e.g., in the case of $C_{60}$, $C_{70}$, . . . , $C_{84}$, . . . ) or solid (nanotubes, onions) fullerenic material is collected by injecting a jet of a suitable collection liquid 208 (depending on the specific type of the collected fullerenic material) in the direction of the exhaust gas flow at or close to the sampling point 206c. Cooling and dilution of the fullerenic material by the liquid jet quenches any ongoing chemical reactions, limits further physical interactions (such as coagulation) of the targeted products after leaving the reactor, and helps prevent the adhesion of fullerenic material to the walls of the egress conduit 206b. It is believed that the droplets entrap the gaseous and/or particulate fullerenic material as it emerges from the combustion reactor, and thereby stops or minimizes the extent of on-going chemical reactions and physical processes that ordinarily ensues after synthesis of the fullerenic material.

The droplets are channeled to a liquid disengagement column 212, which converts the entrained flow of droplets in the egress conduit 206b into a liquid suspension 214 that can be collected at the bottom of the column. The column 212 may be filled with, for example, glass beads in order to increase residence time and to improve mixing of the fullerenic material with the liquid suspension. The exhaust gas 216 exits at the top of the column. The collected liquid suspension 214 can be dispersed by a shower-head-type device 218 at the top of the disengagement column and fed back into the collection system in a counter-flow direction to the exhaust gas, or used to help form the high-velocity liquid jet of the collection liquid 208.

In one embodiment, the liquid suspension of fullerenic material 214 can be removed from the collection system 200 as a slip stream 220 from the recycle loop 222, as fresh collection liquid is introduced into the stream 224 feeding the high-velocity jet. In order to avoid saturation of the liquid suspension, a fraction of the liquid suspension may be removed continuously or when deemed necessary or desirable by the operator. In order to keep the volume of collection liquid 208 constant, a volume of fresh collection liquid 226 equal to the amount of removed suspension is injected.

In one embodiment of the startup procedure, the collection liquid is injected at both the sampling point 206c and via the showerhead 218 until the desired volume of collection liquid in the system is attained. In an alternative embodiment, the bottom of the disengagement column 212 is filled with the amount of collection liquid desired to be present in the system and the collection liquid is pumped via conduit of recycle loop 222 to both the sampling point 206c and showerhead 218.

The collection liquid may be recycled through recycle loop 222 from the bottom of the disengagement column, and reused at both the sampling point 206c and the showerhead 218. In an alternative embodiment, depending on the rate at which the collection liquid is removed and fresh liquid added, the liquid jet at the sampling point 206c may consist of either only fresh collection liquid or a mixture of fresh collection liquid and liquid suspension containing fullerenic material. In a further alternative embodiment, depending on the partition of collection liquid to the sampling point 206c and showerhead 218, exclusively fresh collection liquid may be fed to the sampling point 206c, while a mixture of fresh and recycled liquid is channeled to the showerhead 218.

Subsequent processing of the fullerenic material is greatly benefited by the rapid quenching of chemical reactions and physical agglomeration through the rapid mixing of reactor product with injected suspension liquid. In addition, these benefits can be enhanced by the use of reactants or additives in the collecting liquid 226 as mentioned above.

The in-line liquid-phase processing carried out downstream of collection, but prepared for or initiated during collection, may include solvent extraction of selected classes of fullerenic materials, acid extraction of catalyst particles, acid and/or oxidative opening of fullerenic structures, cutting or shortening of nanotubes, exfoliation and dispersion of nanotube bundles, ropes and rafts, dispersion of nanotubes, and derivatization of fullerenes, nanotubes, or other fullerenic nanostructures.

The system and methods described with reference to FIGS. 1 and 2 are contemplated as being appropriate for larger scale production.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of collecting non-agglomerated fullerenic material comprising:
generating fullerenic material in a reactor as gaseous dispersion of fullerenic material in a non-agglomerated state;
introducing the fullerenic material in a non-agglomerated state into an entrainment chamber;
contacting the fullerenic material with a fluid in the entrainment chamber, wherein the fullerenic material is captured by the fluid and is substantially non-agglomerated within the fluid; and
collecting the fluid containing the non-agglomerated, captured fullerenic material, wherein the fluid is in a liquid form during said collecting and the fullerenic material is not collected as a powder.

2. The method of claim 1, wherein the fullerenic material prior to said contacting is at least one member selected from the group consisting of a condensable gas, a condensed solid, and solid particulates.

3. The method of claim 1, wherein the fullerenic material comprises fullerenes.

4. The method of claim 1, wherein the fullerenic material comprises nanotubes.

5. The method of claim 4, wherein the nanotubes are produced in a flame combustion process in the presence of a catalyst.

6. The method of claim 1, wherein:
said gaseous suspension comprising fullerenic materials is generated by combusting an unsaturated hydrocarbon fuel and oxygen in a burner chamber at sub-atmospheric pressures.

7. The method of claim 1, wherein the gaseous suspension of fullerenic material further comprises a diluent gas.

8. The method of claim 7, wherein the diluent gas is at least one member selected from the group consisting of an inert gas, a reactive gas, gas vapor, nitrogen, a noble gas, carbon dioxide, steam, flue gases, and mixtures thereof.

9. The method of claim 1, wherein the fluid comprises an organic solvent or an aqueous solvent.

10. The method of claim 1, wherein the fluid comprises an additive.

11. The method of claim 10, wherein the additive is at least one member selected from the group consisting of oxidation agents, acids, bases, surfactants, radical scavengers, chemical quenching agents, and chemical stabilization agents.

12. The method of claim 9, wherein the organic solvent is at least one member selected from the group consisting of substituted aromatic molecules, alkyl substituted aromatics, halogenated substituted molecules, halogenated alkanes, partially hydrogenated aromatics, alkylamines, cyclic ethers, ortho-dichlorobenzene, xylene, benzene, dimethylformamide, ethylene chloride, chloroform, 1,2,4 trimethylbenzene, 1,2,3,4 tetramethylbenzene, tetrahydrofuran, 1,2 dibromobenzene, 1,1,2,2, tetrachloroethane, 1,2,3,4 tetrahydronapthalene, octadecylamine, acetone, and mixtures thereof.

13. The method of claim 9, wherein the aqueous solvent comprises a surfactant, said surfactant is at least one member selected from the group consisting of sodium cholate, NaDBS ($C_{12}H_{25}C_6H_4SO_3Na$), sodium octylbenzene sulfonate (NaOBS; $C_8H_{11}C_6H_4SO_3Na$), sodium butylbenzene sulfonate (NaBBS; $C_4H_9C_6H_4SO_3Na$), sodium benzoate ($C_6H_5CO_2Na$), sodium dodecyl sulfate (SDS; $CH_3(CH_2)_{11}$—$OSO_3Na$) (TX100; $C_8H_{17}C_6H_4(OCH_2CH_2)$n-OH; n=10), dodecyltrimethylammonium bromide (DTAB; CH3$(CH_2)_{11}$N$(CH_3)_3$Br), dextrin, and poly(styrene)-poly(ethylene oxide) (PS-PEO) diblock copolymer.

14. The method of claim 1, further comprising liquid-phase processing of the fullerenic material.

15. The method of claim 14, wherein said liquid-phase processing is at least one member selected from the group consisting of:

extracting a class of fullerenic material from the suspension, acid extraction of catalyst particles, oxidation treatment of catalyst particles, oxidative opening of fullerenic materials; shortening nanotubes, exfoliating and dispersing nanotube bundles, exfoliating and dispersing nanotube ropes, exfoliating and dispersing nanotube rafts, dispersing nanotubes, and derivatizing the fullerenic material.

16. The method of claim 1, wherein said contacting the gaseous suspension with the fluid comprises:

creating a stream of the fluid, said stream comprising a gas, vapor, or liquid droplets of the fluid;

contacting the stream with the gaseous suspension of fullerenic material in an entrainment zone so as to entrain the fullerenic material in the stream; and wherein said collecting the fluid containing the non-agglomerated, captured fullerenic material in a liquid form comprises condensing said fluid to a bulk liquid of the fluid.

17. The method of claim 16, wherein the gaseous suspension is contacted with the fluid in an entrainment zone having a controlled temperature.

18. The method of claim 17, wherein the controlled temperature prevents the fluid from condensing in the entrainment zone.

19. The method of claim 16, wherein contacting the stream with the gaseous suspension of fullerenic material further comprises injecting the stream to intersect with the gaseous suspension of fullerenic material.

20. The method of claim 16, further comprising directing a portion of the bulk liquid for use in providing a subsequent stream of the fluid.

21. The method of claim 1, wherein contacting the gaseous suspension with the fluid comprises bubbling the gaseous suspension through the fluid that is in a bulk liquid form.

22. The method of claim 1, wherein the fullerenic material is generated using a combustion reactor.

\* \* \* \* \*